(12) United States Patent
MacKerron (10) Patent No.: US 7,078,105 B2
(45) Date of Patent: Jul. 18, 2006

(54) CONFORMABLE COPOLYESTER FILM

(75) Inventor: Duncan Henry MacKerron, Cleveland (GB)

(73) Assignee: DuPont Teijin Films U.S. Limited Partnership, Wilmington, DE (US)

(*) Notice: Subject to any disclaimer, the term of this patent is extended or adjusted under 35 U.S.C. 154(b) by 0 days.

(21) Appl. No.: 10/485,680

(22) PCT Filed: Jul. 10, 2002

(86) PCT No.: PCT/GB02/03164

§ 371 (c)(1),
(2), (4) Date: Jun. 9, 2004

(87) PCT Pub. No.: WO03/011950

PCT Pub. Date: Feb. 13, 2003

(65) Prior Publication Data

US 2004/0209094 A1 Oct. 21, 2004

(30) Foreign Application Priority Data

Aug. 1, 2001 (GB) ................................. 0118796.2

(51) Int. Cl.
- *B32B 27/36* (2006.01)
- *C08G 63/12* (2006.01)
- *C08G 63/16* (2006.01)
- *C08G 63/181* (2006.01)
- *C08G 63/183* (2006.01)

(52) U.S. Cl. ................. 428/480; 428/910; 428/195; 428/203; 528/302; 528/308; 528/308.6; 528/308.7

(58) Field of Classification Search .................. None
See application file for complete search history.

(56) References Cited

U.S. PATENT DOCUMENTS

| 4,996,291 A | * | 2/1991 | Yoshinaka et al. .......... 528/272 |
| 6,613,411 B1 | * | 9/2003 | Kollaja et al. ............. 428/40.1 |

FOREIGN PATENT DOCUMENTS

| EP | 0 601 844 | * | 6/1994 |
| GB | 1081144 | | 8/1967 |
| JP | 54 011179 A | | 1/1979 |
| JP | 02 048926 A | | 2/1990 |
| JP | 03 068635 A | | 3/1991 |
| JP | 03 292333 A | | 12/1991 |
| JP | 04-293935 | * | 10/1992 |
| JP | 05 208447 A | | 8/1993 |
| JP | 05 2459340 A | | 9/1993 |
| JP | 07 0-82391 A | | 3/1995 |
| KR | 2002-0031648 | * | 5/2002 |

* cited by examiner

*Primary Examiner*—Vivian Chen
(74) *Attorney, Agent, or Firm*—RatnerPrestia (57) ABSTRACT

A conformable oriented polymeric film comprising a layer of copolyester derived from: (i) one or more diol(s); (ii) an aromatic dicarboxylic acid; and (iii) one or more aliphatic dicarboxylic acid(s) of the general formula $C_nH_{2n}(COOH)_2$ wherein n is 2 to 8, wherein the aromatic dicarboxylic acid is present in the copolyester in an amount of from 60 to 85 mole % based on the total amount of dicarboxylic acid components in the copolyester, wherein the copolyester is a random or alternating copolyester, and wherein after deformation by subjecting and maintaining the film to 7% strain, the stress within the film immediately after deformation dissipates to a residual value of less than 60% of the original value within 10 minutes of said deformation; and use thereof as a conformable medium for signage, advertising, graphic art and other display applications or as an overlaminate for such media.

20 Claims, 2 Drawing Sheets

CONFORMABLE COPOLYESTER FILM

This invention relates to a conformable copolyester film, and its use as a medium for signage, advertising, graphic art and other display applications or as an overlaminate for such media.

Plastic film is used extensively as a medium for signage, advertising, graphic art and other forms of visual communication. Examples of this include labels, stickers, banners, vehicle livery, decal and posters. Clear plastic film is also used for overlamination, either as an integral part of a multilayer construction or as an additional coating component on an existing image or message. Films which provide a "no-label" look, i.e. films which appear to be substantially indistinguishable from the surface to which the film is applied, are particularly desirable. Other visual appearances, including white, silver, gloss and matte are also well-known in the art.

The range of use is in practice very large and consequently the required performance of film can vary greatly. Thus a number of different types of plastic can be employed to form the plastic film and therefore provide the diversity of properties. Nevertheless a market survey of the graphic arts industry in Europe (Alexander Watson Associates Publication: European Annual Review, 1998; "Self-Adhesive Labelstock and Graphic Arts") reported that film made from plasticised polyvinyl chloride (p-PVC) accounts for approximately 80% of all printing substrate consumed.

Polyvinyl chloride films (PVC) have been used extensively because such films are highly flexible, particularly when they contain additives such as plasticizers and/or tackifiers. These flexible films are particularly suitable for graphic works intended to be adherable to irregular or curved surfaces, including for instance surfaces at right-angles to each other, without the need for strong adhesive, enabling the graphic work to be repositioned or removed from the surface and, if desired, re-used on a different surface. Generally, PVC films can be calendered films or cast films. The films generally comprise 45% to 50% by weight of PVC resin together with stabilizers, pigment and a plasticiser such as dioctyl phthalate (DOP). The thickness of such films ranges from about 0.01 to about 0.25 mm. The film is generally supplied with a release liner which is usually paper or paperboard stock either with a cast-coated or poly-coated surface on one side. The characteristic of plasticised PVC film which provides the flexible nature is its ability to dissipate or relax internal stress after deformation. When a film of p-PVC is printed and attached to a supporting surface using an appropriate adhering means, the material will deform easily and adopt the surface topography of the support, providing a pleasing appearance to the display. Due to the material's stress-dissipation properties, very little stress remains after application to the surface to cause the film to recover its original size and shape. Such films do not therefore tend to "lift" away from the underlying surface.

One method to assess the ability of film to dissipate stress comprises testing a strip of film in an extensometer. Typically a specimen of film is strained by 7% (0.07 strain) and held at these new dimensions for a period of time. Plasticised PVC film of the type available commercially displays a stress of around 2.3 kg/mm$^2$ immediately after deformation but this will fall at room temperature by about 80% to around 0.4 kg/mm$^2$ within about 10 minutes after stretching.

The plasticisation of PVC has two primary effects which confer the advantageous properties mentioned above. Firstly, the glass transition temperature (Tg) is lowered and broadened such that the material becomes compliant (reduces in stiffness) and easily deformed at ambient temperature. Secondly, the viscous character dominates the elastic nature of the material, to enable the "relaxation" mechanism to occur.

There are, however, various disadvantages associated with the current use of plasticised PVC films. The decomposition or incineration of p-PVC products may result in the release of dioxins and hydrogen chloride, which is environmentally undesirable. In addition, the plasticiser component (e.g. phthalate esters such as dioctyl phthalate) has been linked with various physiological side-effects. Furthermore, plasticised PVC films suffer from relatively poor solvent resistance, weatherability and tear-resistance. In addition, p-PVC films often exhibit undesirable shrinkage when printed, for example when using ink-jet techniques. It would be desirable to provide a replacement for plasticised PVC films which does not suffer from such disadvantages.

Polyester films have long been used in display applications including labelling. However, because of their stiffness and high dimensional stability, they have not generally been preferred for applications in which the film is required to conform closely to the shape of the object to which the film or label is applied (B. L. Kindberg and R. M. Kimmel, "Films: Flexibility in Labelling", in Paper, Film and Foil Converter, April 1981). Polyester films have generally therefore only been used in labelling intended for relatively flat surfaces or in conjunction with strong adhesives.

It is, however, known to lower the Tg of polyester films, and thereby increase flexibility, by incorporating additional co-monomers. However, in polyesters which are designed to possess a low Tg and low modulus (i.e. low stiffness), it is common for elastic behaviour to dominate over viscous behaviour, i.e. polyesters having a sufficiently low Tg to exhibit good flexibility generally also exhibit a significant degree of elastic character, which is not desirable in the applications mentioned above due to the inherent "shape memory" or elasticity. It has hitherto been difficult to achieve the combined properties required for the applications mentioned above.

It is an object of this invention to provide an alternative conformable film suitable as a medium for display applications which does not suffer from one or more of the disadvantages mentioned above. In particular, it is an object of this invention to provide a film which not only exhibits good flexibility and is adherable to irregular or curved surfaces, including surfaces at right-angles to each other, but also avoids the environmental and/or weatherability and/or tear resistance and/or solvent resistance and/or shrinkage problems of existing p-PVC films. It is a further object of this invention to provide a film which not only exhibits good flexibility and is adherable to irregular or curved surfaces, including surfaces at right-angles to each other, without the need for strong adhesive, enabling the film to be repositioned on, or removed from, the object to which it has been applied and, if desired, re-used on a different object, but also avoids the environmental and/or weatherability and/or tear resistance and/or solvent resistance and/or shrinkage problems of existing p-PVC films.

According to the present invention, there is provided a conformable oriented polymeric film comprising a layer of copolyester derived from:

(i) one or more diol(s);

(ii) an aromatic dicarboxylic acid; and (iii) one or more aliphatic dicarboxylic acid(s) of the general formula $C_nH_{2n}(COOH)_2$ wherein n is 2 to 8, wherein the aromatic dicarboxylic acid is present in the copolyester in an amount of from 60 to 85 mole % based on the total amount of dicarboxylic acid components in the copolyester, wherein the copolyester is a random or alternating copolyester, and wherein after deformation by subjecting and maintaining the film to 7% strain, the stress within the film immediately after deformation dissipates to a residual value of less than 60% of the original value within 10 minutes of said deformation.

The inventors of the present Application have found unexpectedly that the copolyesters defined above not only exhibit a suitably low Tg (around room temperature), and thereby improve the compliance of the film, but also exhibit improved viscous or relaxation properties. Moreover, rather than existing as viscous fluids, the copolyesters can be processed into a film, biaxially drawn and crystallised (heatset) using conventional methods for polyester film processing. Thus, the film exhibits good flexibility and is adherable to irregular or curved surfaces, including surfaces at right-angles to each other, without the need for strong adhesive, enabling the film to be repositioned on, or removed from, the object to which it has been applied and, if desired, re-used on a different object. The film of the present invention is therefore particularly useful as a conformable film suitable as a medium for signage, advertising, graphic art and other display applications or as an overlaminate for such media. Where used as an overlaminate, the film may be used to protect existing signage, advertising and graphic art, for instance to provide scratch resistance and/or UV-protection. The film does not have the environmental drawbacks of existing p-PVC conformable films noted above. In addition, the film exhibits improved tear resistance and shrinkage properties in relation to existing P-PVC films, as well as improved weatherability and solvent resistance.

The term "conformable film" as used herein means a film which will readily deform and adopt the surface topography of the object to which it is applied without recovering its original size and shape and without lifting away from the surface of the object. In one embodiment, the term "conformable film" means a film having stress relaxation properties such that, after deformation by subjecting and maintaining the film sample to 7% strain at –° C., the stress immediately after initial deformation dissipates to a residual value of less than 60%, preferably less than 50%, and most preferably less than 40% of the original level within 10 minutes of said deformation. In addition to the property of stress dissipation, it is important that the initial and residual stresses generated in the material as a result of permanent deformation should be of a suitably low magnitude such that the restraining or frictional force of an adhesive is sufficient to fix the deformed film in its new shape. Thus, for ease of application and subsequent dimensional stability of the film, the initial stress in a film sample after deformation by subjecting and maintaining the film sample to 7% strain should preferably be less than 4.5 kg/mm$^2$, more preferably less than 3.0 kg/mm$^2$, more preferably less than 2.0 kg/mm$^2$, and most preferably less than 1.0 kg/mm$^2$. The residual stress within 10 minutes of the said deformation should be preferably less than 1.7 kg/mm$^2$, more preferably less than 1.3 kg/mm$^2$, more preferably less than 0.9 kg/mm$^2$ and most preferably less than 0.4 kg/mm$^2$.

The thickness of the film is preferably from about 12 to about 250 µm, more preferably from about 12 to about 150 µm, and typically is about 12–100 µm in thickness. Where the film is used as an overlaminate, the film thickness is generally from about 12 to about 35 µm, typically about 25 µm. Where the film is itself used as the signage/display medium, the film is typically about 20–100 µm, preferably about about 50–60 µm, in thickness.

The copolyester film layer is a self-supporting film or sheet by which is meant a film or sheet which (i) is not a liquid or dispersion; (ii) is preferably capable of independent existence in the absence of a supporting base. In other words the film or sheet has an inherent form (i.e. film-like) before use in its intended application which corresponds to the form during use in its intended application. The copolyester is obtainable by condensing said dicarboxylic acids or their lower alkyl (up to 6 carbon atoms) diesters with one or more diols. The aromatic dicarboxylic acid is preferably selected from terephathalic acid, isophathalic acid, phthalic acid, 2,5-, 2,6- or 2,7-naphthalenedicarboxylic acid, and is preferably terephthalic acid. The diol is preferably selected from aliphatic and cycloaliphatic glycols, e.g. ethylene glycol, 1,3-propanediol, 1,4-butanediol, neopentyl glycol and 1,4-cyclohexanedimethanol, preferably from aliphatic glycols. Preferably the copolyester contains only one glycol, preferably ethylene glycol. The aliphatic dicarboxylic acid may be succinic acid, glutaric acid, adipic acid, pimelic acid, suberic acid, azeleic acid or sebacic acid. In one embodiment the aliphatic dicarboxylic acid is selected from succinic acid, adipic acid, azeleic acid and sebacic acid. Preferably the copolyester contains only one aliphatic dicarboxylic acid. Preferably the aliphatic dicarboxylic acid is adipic acid. Particularly preferred examples of copolyesters are (i) copolyesters of azeleic acid and terephthalic acid with ethylene glycol; (ii) copolyesters of adipic acid and terephthalic acid with ethylene glycol; and (iii) copolyesters of sebacic acid and terephthalic acid with an ethylene glycol. Particularly preferred copolyesters are those of adipic acid and terephthalic acid with ethylene glycol.

In a preferred embodiment the aromatic dicarboxylic acid is present in the copolyester in an amount of about 65 to about 75 mole %, preferably about 68 to about 72 mole %, typically at about 70 mole % based on the total amount of dicarboxylic acid component(s) in the copolyester.

The copolyester used in the present invention is a random or alternating copolyester, as opposed to a block copolyester. Preferably, the copolyester is a random copolyester. Reference herein to a random copolyester means a copolyester wherein the different ester monomeric units, i.e. the [aromatic dicarboxylic acid—diol] units and the [aliphatic dicarboxylic acid—diol] units are situated randomly in the chain. Reference herein to an alternating copolyester means a copolyester wherein there is a definite ordered alternation of the monomeric ester units. Preference herein to a block copolyester means a copolyester wherein the chain consists of relatively long blocks of one type of monomeric ester unit joined together followed by relatively long blocks of a different type of monomeric ester unit joined together.

Formation of the copolyester is conveniently effected in a known manner by condensation or ester interchange, generally at temperatures up to about 275° C.

The glass transition temperature (Tg) of the copolyester is preferably below about 50° C., more preferably below about 45° C., more preferably below about 35° C., more preferably below about 30° C. and typically about 25–30° C.

Preferably the film exhibits stress relaxation properties such that, after deformation by subjecting and maintaining the film sample to 7% strain, the stress immediately after initial deformation dissipates to a residual value of less than 60%, preferably less than 50%, and most preferably less than 40% of the original level within 10 minutes of said deformation. Under these conditions of strain, the film should preferably exhibit an absolute value of stress which, measured in the same direction of strain, is initially less than 4.5 kg/mm$^2$, preferably less than 3.0 kg/mm$^2$, more preferably less than 2.0 kg/mm$^2$, and most preferably less than 1.0 kg/mm$^2$. The corresponding stress within 10 minutes of the said deformation should be preferably less than 1.7 kg/mm$^2$, more preferably less than 1.3 kg/mm$^2$, more preferably less than 0.9 kg/mm$^2$ and most preferably less than 0.4 kg/mm$^2$. The film preferably exhibits the properties of stress dissipation and low initial and residual stress noted above in both the machine dimension (MD) and the transverse dimension (TD).

The shrinkage of the film, measured as described herein, is preferably less than 4%, more preferably less than 2%, and most preferably less than 1%, in either the machine dimension or the transverse dimension. Methods of controlling shrinkage in the final film by varying process parameters during the stretching and heat-setting steps of film manufacture are well-known to the skilled person.

Formation of the film may be effected by conventional techniques well-known in the art. Conveniently, formation of the film is effected by extrusion, in accordance with the procedure described below. In general terms the process comprises the steps of extruding a layer of molten polymer, quenching the extrudate and orienting the quenched extrudate in at least one direction.

The film may be uniaxially-oriented, but is preferably biaxially-oriented. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties.

In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation.

In the preferred flat film process, the film-forming copolyester is extruded through a slot die and rapidly quenched upon a chilled casting drum to ensure that the copolyester is quenched to the amorphous state. Orientation is then effected by stretching the quenched extrudate in at least one direction at a temperature above the glass transition temperature of the copolyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Alternatively, the cast film may be stretched simultaneously in both the forward and transverse directions in a biaxial stenter. Stretching is generally effected so that the dimension of the oriented film is from 2 to 5 times, generally at least 2.5 times, preferably no more than 4.5 times, more preferably no more than 3.5 times its original dimension in the or each direction of stretching. Typically, stretching is effected at temperatures in the range of 30 to 65° C., preferably in the range of 30 to 50° C., and in any case higher than the Tg of the copolyester, preferably about 15° C. higher than the Tg of the copolyester. It is not necessary to stretch equally in the machine and transverse directions although this is preferred if balanced properties are desired.

A stretched film may be, and preferably is, dimensionally stabilised by heat-setting under dimensional restraint at a temperature above the glass transition temperature of the polyester but below the melting temperature thereof, to induce crystallisation of the polyester. The actual heat-set temperature and time will vary depending on the composition of the film but should not be selected so as to substantially degrade the tear resistant properties of the film. Moreover, if the heat-set temperature is too low, too little crystallinity may develop in the film and too little accompanying amorphous chain relaxation will occur. This may reduce the conformability of the film, and in particular may undesirably increase the initial and residual stress in the film after deformation. Within these constraints, a heat-set temperature of about 100 to 165° C., preferably about 120 to 165° C., is generally desirable. Dimensional relaxation ("toe-in"), wherein the film is allowed to relax in a given dimension by up to about 5% and typically about 2–4% during the heat-setting step, may be used to modulate shrinkage of the film.

According to a further aspect of the invention, there is provided the use of a conformable oriented polymeric film comprising a layer of copolyester derived from:

(i) one or more diol(s);

(ii) an aromatic dicarboxylic acid; and (iii) one or more aliphatic dicarboxylic acid(s) of the general formula $C_nH_{2n}(COOH)_2$ wherein n is 2 to 8, wherein the aromatic dicarboxylic acid is present in the copolyester in an amount of from 60 to 85 mole % based on the total amount of dicarboxylic acid components in the copolyester, wherein the copolyester is a random or alternating copolyester, and wherein after deformation by subjecting and maintaining the film to 7% strain, the stress within the film immediately after deformation dissipates to a residual value of less than 60% of the original value within 10 minutes of said deformation, as or in the manufacture of a conformable medium for signage, advertising, graphic art and other display applications or as an overlaminate for such media.

According to a further aspect of the invention, there is provided the use of a conformable oriented polymeric film comprising a layer of copolyester derived from:

(i) one or more diol(s);

(ii) an aromatic dicarboxylic acid; and (iii) one or more aliphatic dicarboxylic acid(s) of the general formula $C_nH_{2n}(COOH)_2$ wherein n is 2 to 8, wherein the aromatic dicarboxylic acid is present in the copolyester in an amount of from 60 to 85 mole % based on the total amount of dicarboxylic acid components in the copolyester, wherein the copolyester is a random or alternating copolyester, and wherein after deformation by subjecting and maintaining the film to 7% strain, the stress within the film immediately after deformation dissipates to a residual value of less than 60% of the original value within 10 minutes of said deformation, as a conformable layer in a medium for signage, advertising, graphic art and other display applications or as an overlaminate for such media.

According to a further aspect of the invention, there is provided the use of a conformable oriented polymeric film comprising a layer of copolyester derived from:
(i) one or more diol(s);
(ii) an aromatic dicarboxylic acid; and
(iii) one or more aliphatic dicarboxylic acid(s) of the general formula $C_nH_{2n}(COOH)_2$ wherein n is 2 to 8, wherein the aromatic dicarboxylic acid is present in the copolyester in an amount of from 60 to 85 mole % based on the total amount of dicarboxylic acid components in the copolyester, wherein the copolyester is a random or alternating copolyester, and wherein after deformation by subjecting and maintaining the film to 7% strain, the stress within the film immediately after deformation dissipates to a residual value of less than 60% of the original value within 10 minutes of said deformation, for the purpose of providing conformability to a medium for signage, advertising, graphic art and other display applications or as an overlaminate for such media.

According to a further aspect of the present invention there is provided a process for the production of a conformable oriented polymeric film which comprises melt-extruding a layer of copolyester derived from
(i) one or more diol(s);
(ii) an aromatic dicarboxylic acid; and
(iii) one or more aliphatic dicarboxylic acid(s) of the general formula $C_nH_{2n}(COOH)_2$ wherein n is 2 to 8, wherein the aromatic dicarboxylic acid is present in the copolyester in an amount of from about 60 to about 85 mole % based on the total amount of dicarboxylic acid components in the copolyester and wherein the copolyester is a random or alternating copolyester, and further comprising the step of stretching the extrudate in at least one direction.

The film may conveniently contain any of the additives conventionally employed in the manufacture of polymeric films. Thus, agents such as cross-linking agents, dyes, pigments, voiding agents, lubricants, anti-oxidants, radical scavengers, UV absorbers, thermal stabilisers, flame retardants and inhibitors, anti-blocking agents, surface active agents, slip aids, optical brighteners, gloss improvers, pro-degradents, viscosity modifiers and dispersion stabilisers may be incorporated as appropriate. In particular, the film may comprise a particulate filler which can improve handling and windability during manufacture. The particulate filler may, for example, be a particulate inorganic filler or an incompatible resin filler or a mixture of two or more such fillers.

By an "incompatible resin" is meant a resin which either does not melt, or which is substantially immiscible with the polymer, at the highest temperature encountered during extrusion and fabrication of the film. The presence of an incompatible resin usually results in a voided layer, by which is meant that the layer comprises a cellular structure containing at least a proportion of discrete, closed cells. Suitable incompatible resins include polyamides and olefin polymers, particularly a homo- or co-polymer of a mono-alpha-olefin containing up to 6 carbon atoms in its molecule. Preferred materials include a low or high density olefin homopolymer, particularly polyethylene, polypropylene or poly-4-methylpentene-1, an olefin copolymer, particularly an ethylene-propylene copolymer, or a mixture of two or more thereof. Random, block or graft copolymers may be employed.

Particulate inorganic fillers include conventional inorganic fillers, and particularly metal or metalloid oxides, such as alumina, silica (especially precipitated or diatomaceous silica and silica gels) and titania, calcined china clay and alkaline metal salts, such as the carbonates and sulphates of calcium and barium. The particulate inorganic fillers may be of the voiding or non-voiding type. Suitable particulate inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the film-forming copolyester.

Preferred particulate inorganic fillers include titanium dioxide and silica.

Titanium dioxide particles may be of anatase or rutile crystal form. The titanium dioxide particles preferably comprise a major portion of rutile, more preferably at least 60% by weight, particularly at least 80%, and especially approximately 100% by weight of rutile. The particles can be prepared by standard procedures, such as the chloride process or the sulphate process. The titanium dioxide particles may be coated, preferably with inorganic oxides such as aluminium, silicon, zinc, magnesium or mixtures thereof. Preferably the coating additionally comprises organic compound(s), such as fatty acids and preferably alkanols, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds. The coating is suitably applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate. The coating layer on the titanium dioxide particles is preferably in the range from 1 to 12% of inorganic oxides, and preferably in the range from 0.5 to 3% of organic compound, by weight based upon the weight of titanium dioxide.

The inorganic filler should be finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 µm, more preferably 0.05 to 1.5 µm, and particularly 0.15 to 1.2 µm.

The size distribution of the inorganic filler particles is also an important parameter, for example the presence of excessively large particles can result in the film exhibiting unsightly 'speckle', i.e. where the presence of individual filler particles in the film can be discerned with the naked eye. It is preferred that none of the inorganic filler particles incorporated into the film should have an actual particle size exceeding 30 µm. Particles exceeding such a size may be removed by sieving processes which are known in the art. However, sieving operations are not always totally successful in eliminating all particles greater than a chosen size. In practice, therefore, the size of 99.9% by number of the inorganic filler particles should not exceed 30 µm, preferably should not exceed 20 µm, and more preferably should not exceed 15 µm. Preferably at least 90%, more preferably at least 95% by volume of the inorganic filler particles are within the range of the volume distributed median particle diameter ±0.8 µm, and particularly ±0.5 µm.

Particle size of the filler particles may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile.

The components of the composition of a layer may be mixed together in a conventional manner. For example, by mixing with the monomeric reactants from which the film-forming copolyester is derived, or the components may be mixed with the copolyester by tumble or dry blending or by compounding in an extruder, followed by cooling and, usually, comminution into granules or chips. Masterbatching technology may also be employed.

In a preferred embodiment, the film of the present invention is optically clear, preferably having a % of scattered visible light (haze) of <10%, preferably <6%, more preferably <3.5% and particularly <2%, measured according to the standard ASTM D 1003. In this embodiment, filler is typically present in only small amounts, generally not exceeding 0.5% and preferably less than 0.2% by weight of a given layer.

In an alternative embodiment, the film is opaque and highly filled, preferably exhibiting a Transmission Optical Density (TOD) (Sakura Densitometer; type PDA 65; transmission mode) in the range from 0.1 to 2.0, more preferably 0.2 to 1.5, more preferably from 0.25 to 1.25, more preferably from 0.35 to 0.75 and particularly 0.45 to 0.65. The film is conveniently rendered opaque by incorporation into the polymer blend of an effective amount of an opacifying agent. Suitable opacifying agents include an incompatible resin filler, a particulate inorganic filler or a mixture of two or more such fillers, as hereinbefore described. The amount of filler present in a given layer is preferably in the range from 1% to 30%, more preferably 3% to 20%, particularly 4% to 15%, and especially 5% to 10% by weight, based on the weight of the layer polymer.

The surface of an opaque film preferably exhibits a whiteness index, measured as herein described, in the range from 60 to 120, more preferably 80 to 110, particularly 90 to 105, and especially 95 to 100 units.

The surface of the film may have thereon one or more further polymeric layers or coating materials. Any coating is preferably performed "in-line".

In one embodiment, the additional coating may comprise a "slip coating" in order to improve the handling and windability of the film. A suitable slip coating may be, for instance a discontinuous layer of an acrylic and/or methacrylic polymeric resin optionally further comprise a cross-linking agent, such as described in EP-A-0408197, the disclosure of which is incorporated herein by reference. An alternative slip coating may comprise a potassium silicate coating, for instance as disclosed in U.S. Pat. Nos. 5,925,428 and 5,882,798, the disclosures of which are incorporated herein by reference.

In a further embodiment, the film has on one surface thereof a hardcoat or scratch resistant layer and optionally a primer layer (such as that disclosed in U.S. Pat. No. 3,443, 950) between the film and the hardcoat. The hardcoat layer provides a degree of mechanical protection to the film, as judged for example by the Taber abraser test (ASTM Method D-1044) with percent haze on the samples determined by ASTM Method D-1003. Suitable hardcoat layers are disclosed in, for instance, U.S. Pat. No. 3,708,225, U.S. Pat. No. 4,177,315, U.S. Pat. No. 4,309,319, U.S. Pat. No. 4,436,851 and U.S. Pat. No. 4,455,205, the disclosures of which are incorporated herein by reference.

In a further embodiment, the film has on one surface thereof an adhesive layer. The adhesive layer may comprise any suitable adhesive, for instance a pressure-sensitive adhesive, and is preferably one which allows the film to be positioned and readily repositioned on a surface and finally removed from a surface without leaving an adhesive residue. A suitable repositionable adhesive is described in U.S. Pat. No. 4,882,211 and identified as Note Stix®. Further suitable adhesives are described in U.S. Pat. No. 5,198,301 and the art referred to therein, particularly U.S. Pat. No. 3,691,140 and U.S. Pat. No. 4,735,837 which describe repositionable adhesives. The disclosures of these documents relating to adhesive compositions is incorporated herein by reference. Permanent adhesives may also be used. Preferably, the film also comprises a release layer, which is removably adhered to the adhesive layer, as are well known in the art.

In a further embodiment, the film has on one surface thereof a printable or ink-receiving layer, and optionally a primer layer (such as that disclosed in EP-0680409, EP-0429179, EP-0408197, EP-0576179 or WO-97/37849, the disclosures of which are incorporated herein by reference) between the film and the printable or ink-receiving layer in order to increase adhesion. Suitable printable or ink-receiving layers are disclosed in, for instance, EP-0696516, U.S. Pat. No. 5,888,635, U.S. Pat. No. 5,663, 030, EP-0289162, EP-0349141, EP-0111819 and EP-0680409, the disclosures of which are incorporated herein by reference.

The exposed surface of the film may, if desired, be subjected to a chemical or physical surface-modifying treatment to improve the bond between that surface and a subsequently applied layer. A preferred treatment, because of its simplicity and effectiveness, is to subject the exposed surface of the film to a high voltage electrical stress accompanied by corona discharge. Alternatively, the film may be pretreated with an agent known in the art to have a solvent or swelling action on the substrate polymer. Examples of such agents, which are particularly suitable for the treatment of a polyester substrate, include a halogenated phenol dissolved in a common organic solvent e.g. a solution of p-chloro-m-cresol, 2,4-dichlorophenol, 2,4,5- or 2,4,6-trichlorophenol or 4-chlororesorcinol in acetone or methanol.

The preferred treatment by corona discharge may be effected in air at atmospheric pressure with conventional equipment using a high frequency, high voltage generator, preferably having a power output of from 1 to 20 kw at a potential of 1 to 100 kv. Discharge is conventionally accomplished by passing the film over a dielectric support roller at the discharge station at a linear speed preferably of 1.0 to 500 m per minute. The discharge electrodes may be positioned 0.1 to 10.0 mm from the moving film surface.

The invention is illustrated by FIGS. 1 to 4 which show the stress relaxation properties of the films as a graph of stress ($kgf/mm^2$) against time after deformation, or as a graph of the stress reduction (% stress relative to the stress immediately after deformation) against time after deformation.

Figure 1:
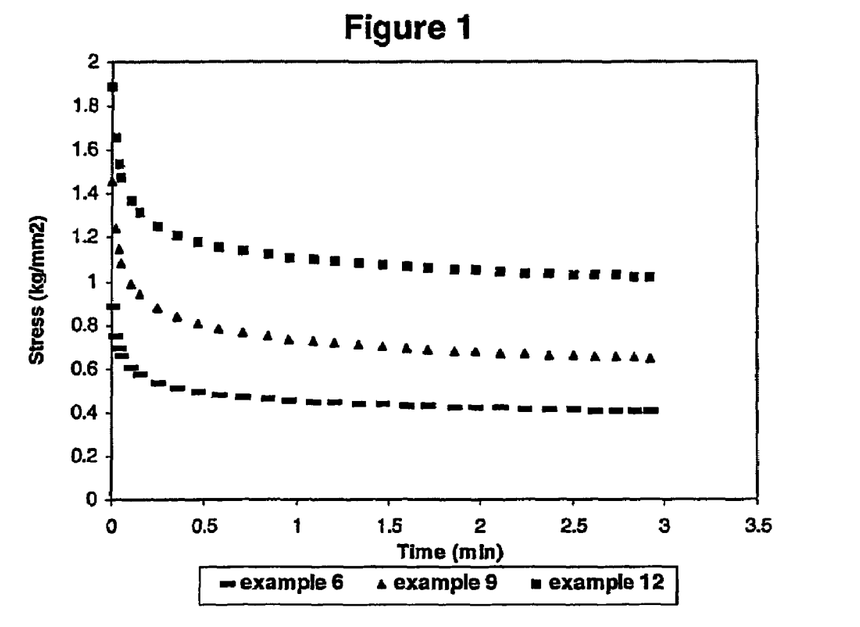
FIGS. 1 and 2 show the stress relaxation of sample films in the machine direction.

FIG. 1 shows the stress relaxation of Example 6, Example 9 and Example 12 illustrating the effects of the draw ratio on stress relaxation in the machine direction. Examples 6, 9 and 12 were prepared using draw ratios of 2.5, 3.5 and 4.5 respectively in both the machine and transverse directions.

The data show that as the draw ratio increases the initial and residual stress in the machine direction of the film after deformation is higher.

Figure 2:
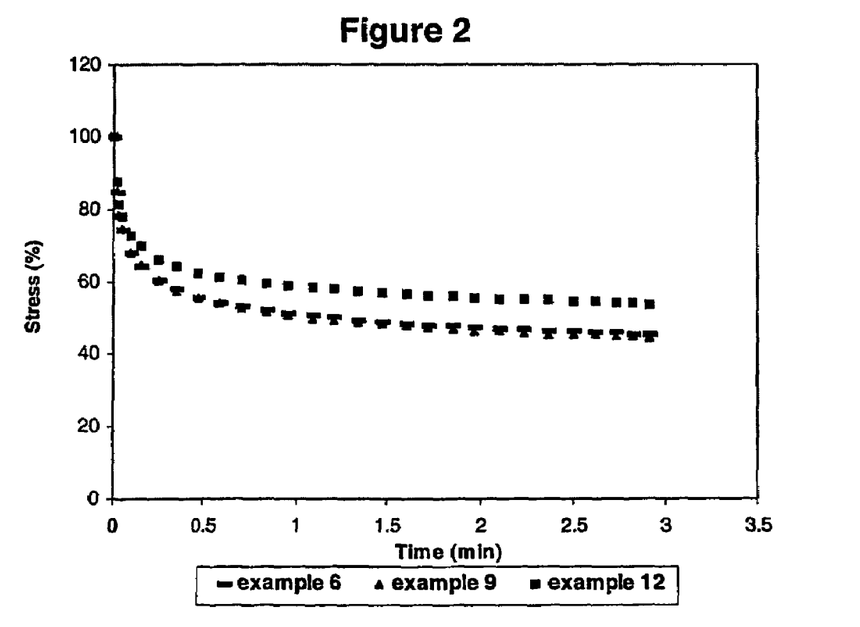

FIG. 2 shows the stress relaxation in the machine direction of Examples 6, 9 and 12 as a graph of stress at time t as a % of stress at t=0 plotted against time t. The data show that low draw ratios will promote a greater degree of stress relaxation.

Figure 3:
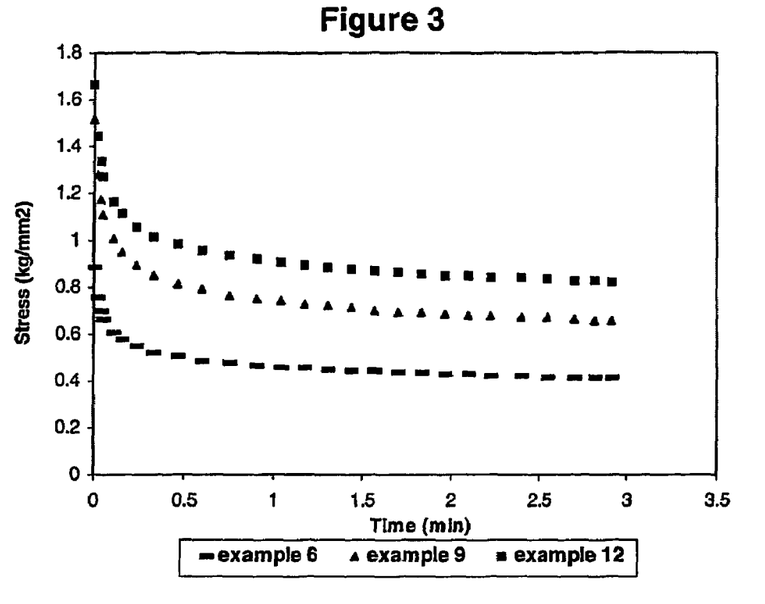
FIGS. 3 and 4 show the stress relaxation of sample films in the transverse direction.
Figure 4:
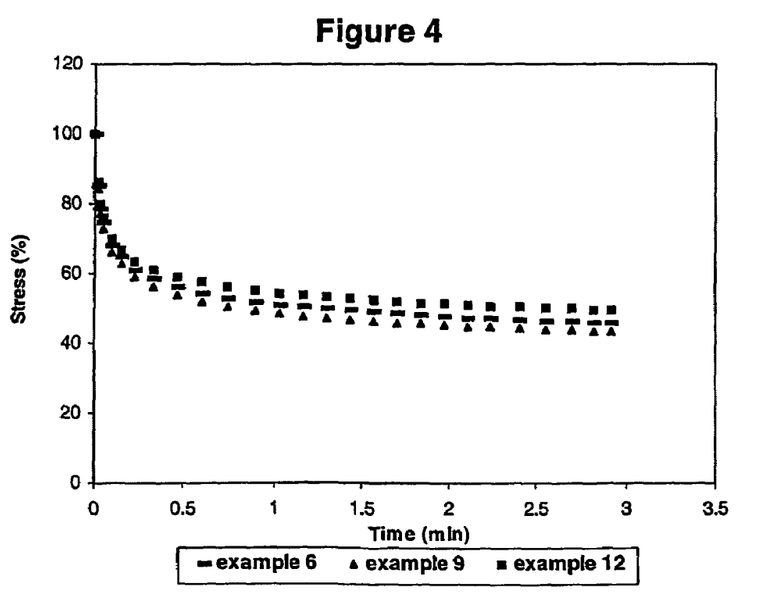

FIGS. 3 and 4 show the data corresponding to FIGS. 1 and 2 respectively in respect of the transverse direction of the films of Examples 6, 9 and 12. The variation in the data in FIG. 3 corresponds to that of FIG. 1 in that the initial and residual stress in the transverse direction of the film is higher as draw ratio increases. However, FIG. 4 shows that despite the different internal stress present in each film under test, the degree of stress relaxation with time in the transverse direction is similar for all examples.

The following test methods may be used to determine certain properties of the polymeric film:
(i) Wide angle haze is measured using a Hazegard System XL-211, according to ASTM D 1003-61.
(ii) Whiteness index is measured using a Colorgard System 2000, Model/45 (manufactured by Pacific Scientific) based on the principles described in ASTM D313.
(iii) Stress and stress relaxation is measured by stretching the film sample by 7% at 21° C. (room temperature) in an Instron Extensometer, model 4464, and holding at that elongation for the duration of the test. The Instron instrument also measures and records at intervals over the subsequent 10 minutes, the load applied to maintain the sample at this elongation. From those readings, the stress within the film is calculated and a stress relaxation graph obtained by plotting the measured stress versus time.
(iv) Unless otherwise specified, shrinkage was measured using a Perkin-Elmer TMA-7 instrument. Samples of film were heated in air under minimal load, to 100° C. and allowed to shrink freely at that temperature for 60 minutes. Final shrinkage was measured after cooling to room temperature and expressed as a percentage of the original length of specimen.
For the purposes of comparison with PVC film, a further, alternative method was employed in which a sample of film with initial dimensions 100 mm×100 mm was heated unrestrained in an oven at 100° C. (see Table 2 and Example 9 and the p-PVC Comparative Example). Shrinkage was again expressed as a percentage of the original length of specimen after cooling, with reference to the MD and TD axes of the film.
(v) The tear properties of the films of the present invention are characterised using two parameters, namely the "maximum load" and the "tear toughness", measured as described below.
The maximum load is a measure of the force required to initiate tearing of the film, i.e. the load at the onset of tearing, and is measured in accordance with ASTM D1004-94A (Graves Tear Test). This parameter is referred to in ASTM D1004-94A as the initial tear-resistance, and is expressed in Newtons or kilograms-force. The maximum load values reported herein have been normalised to a reference thickness of 50 μm.
The tear toughness is measured as the Graves Area of the film, as described in EP-A-0592284. The Graves Area is obtained by mathematically integrating the area beneath the curve in a graphical plot of the stress versus the strain for a film subjected to the Graves Tear Test (ASTM D1004-94A), i.e. during a test in which a film sample specifically shaped for a Graves Tear Test is clamped between opposed jaws that are moved apart at a constant rate to concentrate the tearing stresses in a small area. The stress is defined as the recorded load divided by the initial cross-sectional area of the film opposite the notch feature of the test sample. The strain is defined as the ratio of the change in the distance between the jaws (Δl) that occurs during the test, to the initial separation of the jaws (l), i.e. strain is Δl/l. Thus, tear toughness may be regarded as a measure of the total energy required to cause the film to fail, i.e. the ability of the film to absorb energy before failure. It will be understood that film with a relatively large tear toughness value will require a larger amount of total energy to cause failure, compared to film with a relatively small tear toughness value. The tear toughness may vary depending on whether the test is conducted in the machine or the transverse direction of the film. Preferably, films according to the invention demonstrate a tear toughness in one direction of the film equal to at least 0.3 kg/mm$^2$, preferably at least 0.6 kg/mm$^2$, and more preferably at least 0.9 kg/mm$^2$.

The invention is further illustrated by the following examples. It will be appreciated that the examples are for illustrative purposes only and are not intended to limit the invention as described above. Modification of detail may be made without departing from the scope of the invention.

EXAMPLES

A series of copolyester compositions were synthesised using conventional techniques, as described herein, and films prepared therefrom. The general method of film preparation is set out below. The specific details of the copolyester films and the stress relaxation properties thereof are shown in Table 1. The value for Tg in Table 1 is that of the copolyester itself rather than that of the film. The copolyesters are all based on poly(ethylene terephthalate) containing adipic acid (AA) as comonomer. The amount of adipic acid in Table 1 is given as a percentage of the total dicarboxylic acid content of the copolyester (i.e. the amount of terephthalic acid of the normal PET recipe which is substituted by adipic acid). Some of the copolyesters also contain a second glycol (neopentyl glycol (nPG); or cyclohexanedimethanol (CHDM)) as comonomer. The amount of the second glycol is given as a percentage of the total glycol content of the copolyester.

The polymer composition was extruded and cast onto a cooled rotating drum and, in most instances, subjected to sequential stretching operations, as described herein. This involved first stretching the film in the direction of extrusion at a temperature of 45° C. and then effecting a second stretching step in the sideways direction, also at a temperature of 45° C. The films prepared in this way are those identified by the "SEQ" reference in Table 1. In some cases, the forward and sideways draws were performed simultaneously and the films prepared in this way are those identified by the "SIM" reference in Table 1. The biaxially stretched film was heat-set under full restraint by conventional means. The draw ratios, i.e. the ratio of the stretched dimension to the original dimension in each direction, and the heat-set temperatures are given in Table 1. SEQ means that the forward and sideways draws were performed in sequence; SIM means that both draws were performed simultaneously.

The films were characterised using the stress relaxation test described herein and the results are shown in Table 1. The stress relaxation values refer to the stress remaining in a sample of film which is subject to and maintained at a fixed strain of 7% after set periods of time (3 or 10 minutes) at room temperature. Measurements in both the machine direction (MD) and the transverse direction (TD) were taken and the % residual stress calculated.

The results are also displayed graphically in FIGS. 1 to 4, as described above.

The data in Table 1 shows that the films of the present invention exhibit good stress relaxation, with as little as 38% residual stress in some films and absolute values of around 0.6 kg/mm$^2$ after 10 minutes.

A negative value for the % shrinkage indicates an expansion in the test used.

The data show that in all cases the copolyester films of the present invention show better dimensional stability than the plasticised PVC Comparative Example, and when manufactured under optimum conditions show shrinkage properties which are significantly superior.

The films were also characterised by measuring their tear resistance using the test method described herein. The results are shown in Table 3.

TABLE 1

| | | | | | | Stress Relaxation | | | | | | |
|---|---|---|---|---|---|---|---|---|---|---|---|---|
| | | | | Max. stress (kg/mm$^2$): | | | | | | | | |
| | | | Draw Ratios | Heat Set | 0 minutes | | Stress after 3 minutes (kg/mm$^2$) | | | Stress after 10 minutes (kg/mm$^2$) | | |
| Ex. | Composition | Tg (C) | MD × SD | (C.) | MD | TD | MD | MD (%) | TD | TD (%) | MD | MD (%) | TD | TD (%) |
| 1 | 29.4% AA | 29° | 2.6 × 3.1 | 100° | 2.96 | 3.85 | 1.42 | 48 | 1.85 | 48 | 1.23 | 42 | 1.6 | 42 |
| 2 | | | | SEQ 120° | 2.73 | 2.59 | 1.25 | 46 | 1.14 | 44 | 1.09 | 40 | 0.99 | 38 |
| 3 | | | | 160° | 1.32 | 1.21 | 0.553 | 42 | 0.557 | 46 | 0.48 | 36 | 0.48 | 40 |
| 4 | 29.4% AA | 29° | 2.5 × 2.5 | 100° | 1.97 | 2.24 | 0.906 | 46 | 1.01 | 45 | 0.78 | 40 | 0.87 | 39 |
| 5 | | | | SEQ 120° | 1.34 | 1.55 | 0.632 | 47 | 0.697 | 45 | 0.55 | 41 | 0.6 | 39 |
| 6 | | | | 160° | 0.89 | 0.89 | 0.4 | 45 | 0.42 | 47 | 0.35 | 39 | 0.36 | 41 |
| 7 | 29.4% AA | 29° | 3.5 × 3.5 | 100° | 3.54 | 4.36 | 1.7 | 48 | 2.27 | 52 | 1.47 | 42 | 1.96 | 45 |
| 8 | | | | SEQ 120° | 2.85 | 3.21 | 1.4 | 49 | 1.54 | 48 | 1.21 | 42 | 1.33 | 42 |
| 9 | | | | 160° | 1.46 | 1.52 | 0.64 | 44 | 0.67 | 44 | 0.55 | 38 | 0.58 | 38 |
| 10 | 29.4% AA | 29° | 4.5 × 4.5 | 100° | 2.01 | 2.66 | 1 | 50 | 1.41 | 53 | 0.87 | 43 | 1.22 | 46 |
| 11 | | | | SEQ 120° | 2.26 | 2.62 | 1.13 | 50 | 1.39 | 53 | 0.98 | 43 | 1.2 | 46 |
| 12 | | | | 160° | 1.9 | 1.67 | 0.99 | 52 | 0.8 | 48 | 0.85 | 45 | 0.7 | 42 |
| 13 | 29.4% AA | 29° | 4.5 × 4.5 | 100° | 3.76 | 4.04 | 1.95 | 52 | 2.02 | 50 | 1.69 | 45 | 1.75 | 43 |
| 14 | | | | SIM 120° | 3.95 | 3.81 | 1.98 | 50 | 1.83 | 48 | 1.71 | 43 | 1.58 | 42 |
| 15 | 28% AA | 31° | 3.5 × 3.5 | 100° | 4.441 | | 1.961 | 44 | | | 1.628 | 37 | | |
| 16 | | | | SEQ 120° | 3.206 | | 1.383 | 43 | | | 1.278 | 40 | | |
| 17 | | | | 160° | 2.077 | | 0.782 | 37 | | | 0.648 | 31 | | |
| 18 | 24% AA, | 40° | 3.5 × 3.5 | 100° | 7.029 | | 3.23 | 46 | | | 2.994 | 43 | | |
| 19 | 7% nPG | | | SEQ 120° | 8.238 | | 2.734 | 33 | | | 2.315 | 28 | | |
| 20 | | | | 160° | 4.564 | | 1.349 | 30 | | | 0.974 | 21 | | |
| 21 | 24% AA, | 41° | 3.5 × 3.5 | 100° | 7.103 | | 3.061 | 43 | | | 2.721 | 38 | | |
| 22 | 10% CHDM | | | SEQ 120° | 6.287 | | 2.727 | 43 | | | 2.401 | 38 | | |
| 23 | | | | 160° | 4.504 | | 1.511 | 34 | | | 1.174 | 26 | | |

The films were also characterised by measuring their shrinkage using the test methods described herein. Example 9 and the P-PVC Comparative Example were analysed using the alternative test method described herein, i.e. as square specimens (100 mm×100 mm) in an air oven at 100° C. The results are shown in Table 2.

TABLE 2

| | % Shrinkage | | |
|---|---|---|---|
| Example | MD | TD | Average |
| 4 | 2.1 | −1.6 | 0.25 |
| 5 | 0.8 | 0.2 | 0.5 |
| 6 | 1.2 | 0 | 0.8 |
| 10 | 0.5 | −0.6 | −0.05 |
| 11 | 0.8 | 1.4 | 1.1 |
| 12 | 2.4 | 1.6 | 2.1 |
| 9 | 2.2 | 1.8 | 2.0 |
| p-PVC Comparative Example | 6.0 | 2.0 | 4.0 |

TABLE 3

| | Tear Resistance in MD by Graves Method | |
|---|---|---|
| Example | Maximum Load (50μ film) (kgf) | Tear Toughness (kg/mm$^2$) |
| 4 | 1.436 | 1.779 |
| 5 | 1.680 | 2.194 |
| 7 | 1.206 | 1.272 |
| 8 | 1.588 | 1.388 |
| 9 | 1.106 | 1.366 |
| 10 | 2.250 | 0.938 |
| 11 | 1.778 | 0.927 |
| 15 | 2.227 | 0.669 |
| 17 | 1.191 | 0.722 |
| 18 | 2.058 | 0.756 |
| 20 | 1.335 | 0.989 |
| 21 | 2.191 | 0.773 |
| 23 | 1.288 | 0.843 |
| p-PVC Comparative Example | 0.766 | 0.536 |

The date show that in all cases the films of the present invention exhibit better tear resistance than the plasticised PVC Comparative Example.

The invention claimed is:

1. A conformable oriented polymeric film comprising a layer of copolyester derived from:
   (1) one or more diol(s);
   (2) an aromatic dicarboxylic acid; and
   (3) one or more aliphatic dicarboxylic acid(s) of the general formula $C_nH_{2n}(COOH)_2$ wherein n is 2 to 8,
   wherein the aromatic dicarboxylic acid is present in the copolyester in an amount of from 60 to 85 mole % a based on the total amount of dicarboxylic acid components, wherein the copolyester is a random or alternating copolyester, and wherein after deformation by subjecting and maintaining the film to 7% strain, the stress within the film immediately after deformation dissipates to a residual value of less than 60% of the original value within 10 minutes of said deformation.

2. A film according to claim 1 which is biaxially oriented.

3. A film according to claim 1 wherein the copolyester is derived from only one diol.

4. A film according to claim 1 wherein the copolyester is derived from ethylene glycol.

5. A film according to claim 1 wherein said aromatic dicarboxylic acid is terephthalic acid.

6. A film according to claim 1 wherein the copolyester is derived from only one aliphatic dicarboxylic acid.

7. A film according to claim 1 wherein said aliphatic dicarboxylic acid is succinic acid, glutaric acid, pimelic acid, suberic acid, azeleic acid or sebatic acid.

8. A film according to claim 1 wherein aliphatic dicarboxylic acid is adipic acid.

9. A film according to claim 1 wherein said aromatic dicarboxylic acid is present in the copolyester in an amount of about 65 to about 75 mole % based on the total amount of dicarboxylic acid components in the copolyester.

10. A film according to claim 1 wherein said copolyester is a random copolyester.

11. A film according to claim 1 wherein the glass transition temperature of said copolyester is below about 35° C.

12. A film according to claim 1 wherein after deformation by subjecting and maintaining the film to 7% strain, the stress within the film immediately after deformation dissipates to a residual value of less than 40% of the original value within 10 minutes of said deformation.

13. A film according to claim 1 wherein after deformation by subjecting and maintaining the film to 7% strain, the initial stress within the film is less than 4.5 kg/mm2.

14. A film according to claim 1 wherein after deformation by subjecting and maintaining the film to 7% strain, the residual stress within 10 minutes of the said deformation is less than 1.7 kg/mm2.

15. A film according to claim 1 wherein the shrinkage after treatment in air at 100° C. for 60 minutes is less than 4% in both the machine and transverse dimensions.

16. A display article comprising a conformable oriented polymeric film comprising a layer of copolyester derived from:
   (i) one or more diol(s);
   (ii) an aromatic dicarboxylic acid; and
   (iii) one or more aliphatic dicarboxylic acid(s) of the general formula $C_nH_{2n}(COOH)_2$ wherein n is 2 to 8,
   wherein the aromatic dicarboxylic acid is present in the copolyester in an amount of from 60 to 85 mole % based on the total amount of dicarboxylic acid components in the copolyester, wherein the copolyester is a random or alternating copolyester, and wherein after deformation by subjecting and maintaining the film to 7% strain, the stress within the film immediately after deformation dissipates to a residual value of less than 60% of the original value within 10 minutes of said deformation.

17. The display article according to claim 16 wherein said display article is an advertising sign.

18. The display article according to claim 16 wherein said display article is a graphic arts display.

19. The display article according to claim 16 wherein said conformable film is laminated on said article.

20. The display article according to claim 19 wherein said laminated conformable film is an outer layer thereof.

* * * * *

UNITED STATES PATENT AND TRADEMARK OFFICE
CERTIFICATE OF CORRECTION

| | | |
|---|---|---|
| PATENT NO. | : 7,078,105 B2 | Page 1 of 1 |
| APPLICATION NO. | : 10/485680 | |
| DATED | : July 18, 2006 | |
| INVENTOR(S) | : Duncan Henry Mackerron | |

It is certified that error appears in the above-identified patent and that said Letters Patent is hereby corrected as shown below:

Col. 15, line 28, delete "sebatic acid." and insert --sebacic acid.--.

Col. 15, line 29, after the word "wherein", insert the word --the--.

Col. 16, line 6, last number 2 should be superscript.

Col. 16, line 10, last number 2 should be superscript.

Signed and Sealed this

Twenty-eighth Day of August, 2007

JON W. DUDAS
*Director of the United States Patent and Trademark Office*